Patented Mar. 26, 1946

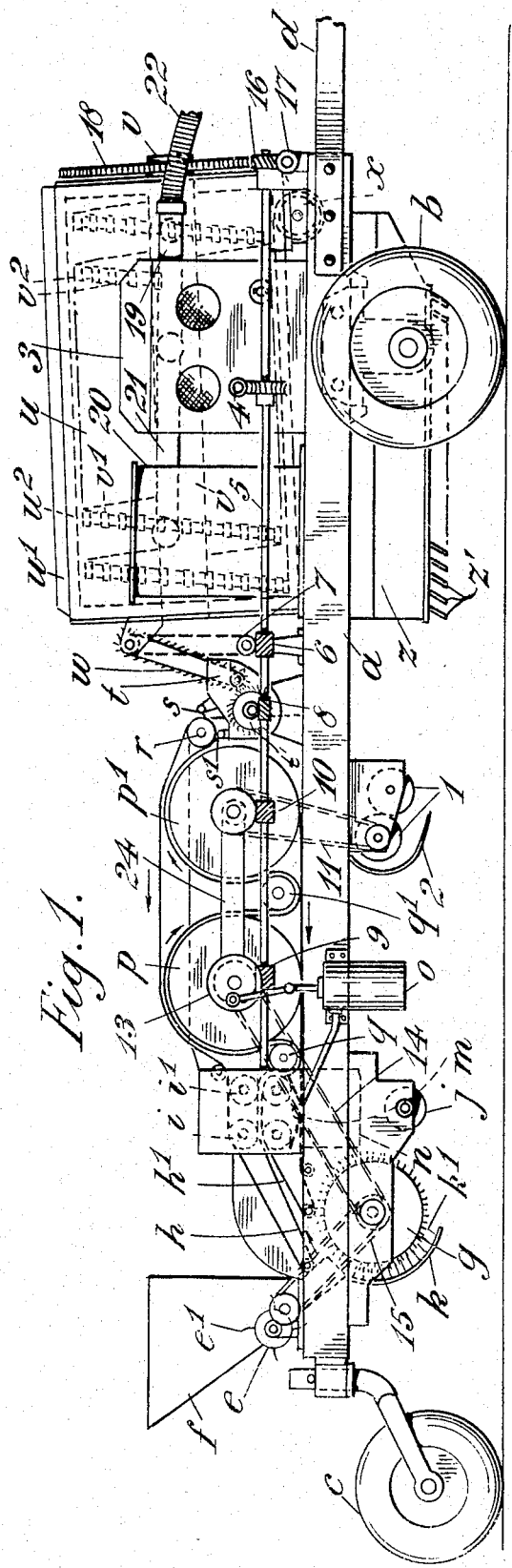

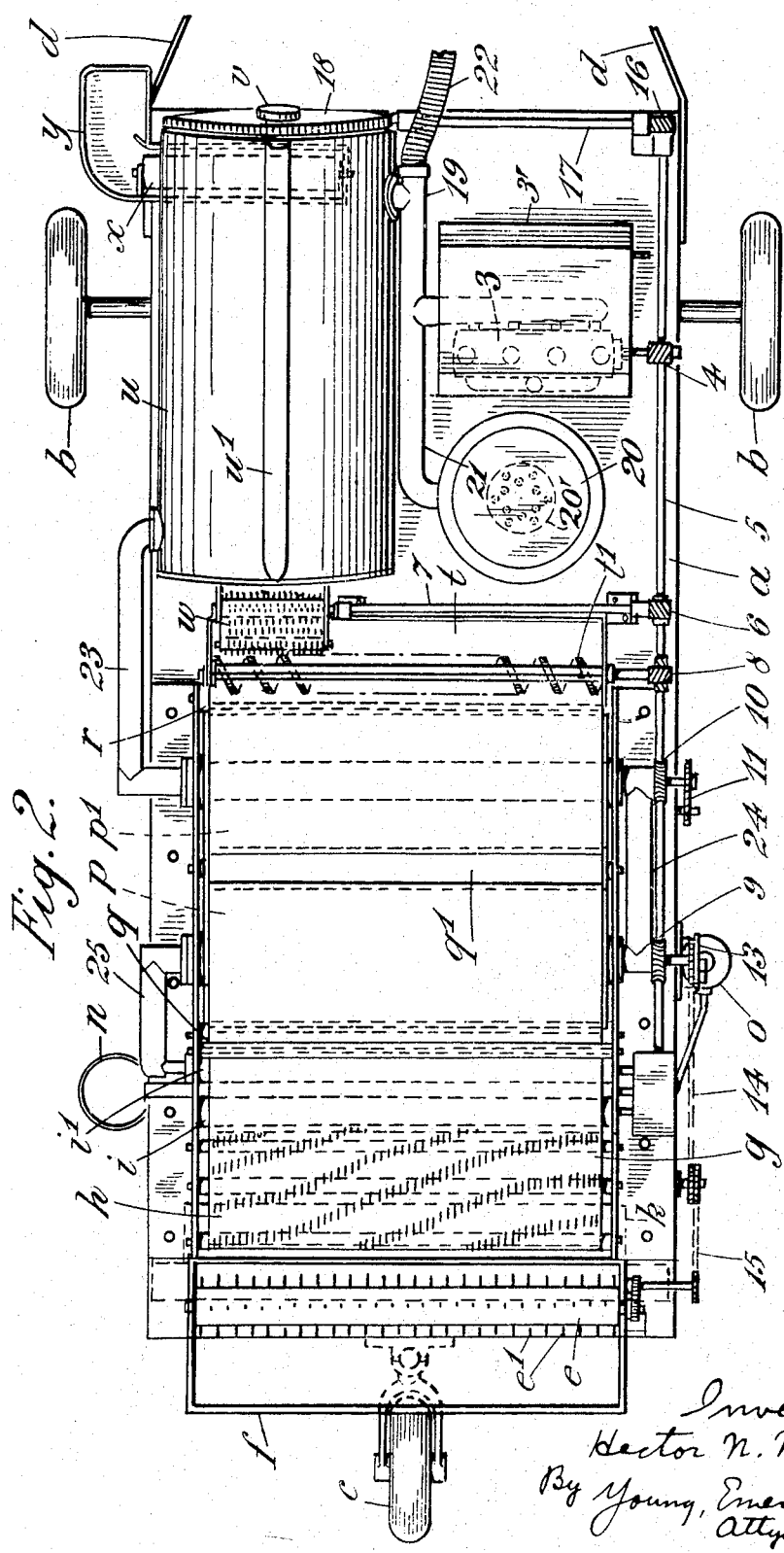

2,397,363

UNITED STATES PATENT OFFICE 2,397,363

DRYING APPARATUS OR DEHYDRATING PLANT FOR THE TREATMENT OF GRASS, PEAT, AND OTHER MOIST SUBSTANCES

Hector Norman McLeod, London, England

Application October 11, 1944, Serial No. 558,198
In Great Britain September 3, 1943

13 Claims. (Cl. 44—30)

This invention of improvements in drying apparatus or dehydrating plant for the treatment of grass, peat and other moist substances has for its object to provide a compact and highly efficient apparatus adapted for dealing with crops such as grass, clover and lupin, or materials such as peat, and seaweed and other moist substances such as vegetables, fruits, and edibles and wastes and by-products which require to be treated in bulk for the prompt removal of the moisture content. A further object of the invention is to adapt the plant for haulage over a harvesting field, or over a bog or peat deposit and for picking up the crop or ground material and passing it through the drying apparatus.

According to this invention, there is provided in combination means for comminuting or dividing up the material collected by or fed into the apparatus, endless conveyor means adapted for taking a grip on material received from the comminutor, pressing means active upon the conveyor means at one point in its travel to compress the material and remove portion of the moisture, heated drums supporting the conveyor means over a portion of its further travel, a heating and drying chamber receiving delivery from the conveyor means, and a source of heat or heat economiser means adapted for supplying heated air or hot gases and vapours to the units requiring heat supply.

According to a further feature of the invention, a plant comprising the combination aforesaid is mounted on a support, such as a sled device, adapted for being hauled over the ground, the comminuting means on the said support being adapted for collecting a crop from the ground and passing it into the grip of the endless conveyor means, or even for mowing the crop and collecting it and passing it on for treatment. When peat is to be collected and treated, a scarifier device may be affixed to the under part of the support; this device being adapted for scarifying the peat layer and enabling it to be picked up by the collector of the comminuting means. When roots such as are met with in peat working are to be collected and treated, a slicing or mincing device may be affixed under the support and adapted for slicing or mincing the roots ready for being picked up by the said collector.

In order to enable the invention to be readily understood, reference is made to the accompanying drawings wherein:

Figure 1 is a more or less diagrammatic side elevation of a mobile dehydrating plant embodying the present improvements, and Figure 2 is a plan of Figure 1.

Referring to the drawings, $a$ is a frame supported at the front by a pair of wheels $b$ and at the rear by a castor wheel $c$. These wheels are detachably mounted for a reason to be hereinafter explained. A draw bar arrangement $d$ is fixed to the front end of the frame $a$ for enabling the latter and the plant thereon to be hauled over the ground, as by a motor tractor. It is to be understood that the frame $a$ may be fixedly installed on a given site when so desired.

At the rear end of the frame $a$ there is a feed hopper $f$ provided in its bottom part with a revoluble drum $e$ carrying flexible beaters $e^1$. Material to be treated may be introduced into the hopper $f$ in a suitably divided condition, whereupon it comes under the influence of the beaters $e^1$ which compress and feed it on to a revolving drum $g$ provided on its exterior with blades, teeth, brush wires or the like. The drum $g$ then feeds the material in a further disintegrated or divided condition to an inlet bight between two endless travelling conveyor bands $h$, $h^1$ hereinafter described.

If the apparatus is to be used as a mobile plant for treating grass or peat, the wheels $b$ and $c$ are removed and the frame $a$ is mounted on suitable sled runners $z$ so that the lower part of the drum $g$ comes near the ground and a roller $j$ in advance of the drum $g$ comes on, or sufficiently close, to the ground for rolling the crop and facilitating the picking up of such crop by the drum $g$ and its associate part now to be described.

The associate part referred to is a segment plate $k$ extending partly around the drum $g$ rearwardly thereof and so as to leave a space between it and the drum. The bottom edge of the plate $k$ may be fitted with curved teeth or tines for facilitating the raising of the crop to the drum $g$. Blades on the drum may be serrated or of any desired formation and for some crops the exterior of the drum may be furnished with a multiplicity of disintegrating points of wire, metal or other hard substance. Such points may be set in between the blades on the drum. The cutting edges of the blades may have incisions made in them at an angle so as to impart a rolling or traversing motion to the particles of the material under treatment. Or, the drum may be constructed as a rotary brush and may have shallow channels cut or pressed in its surface to assist disintegration of the material treated. The segment plate $k$ on its inner surface is furnished with a multiplicity of sharp points $k^1$ extending into the space between it and the drum $g$. Or, it may be fitted with a wire mat presenting numerous points of wire extending near to the periphery of the drum $g$. As will now be apparent, the grass or peat having been rolled by the roller $j$ is caught up into the space between the plate $k$ and drum $g$ in which space it is disintegrated or cut up by the blades, points, wires or the like on the exterior of the drum $g$ and interior of the plate $k$ and is then fed by the drum $g$ to the entry bight between the two conveyor bands $h$, $h^1$.

The drum $g$ and plate $k$ constitute what has been referred to as a comminutor, but other forms of comminutor may be employed. For example, a comminutor may consist of two travelling webs or wire mats having a multiplicity of opposed hard points and moving at different speeds. The webs may be endless and unidirectional in their travel but they may be of an oscillatory or reciprocatory nature. Alternatively, two oscillatory or reciprocatory plates presenting opposed blades or points may be used, or a plate provided with blades or points may operate in conjunction with a many pointed wire mat.

The comminuted material fed by the drum $g$ into the entry bight between the conveyor bands $h$, $h^1$ is gripped between the latter as the bight closes (as will be apparent from Figure 1) and is then carried by the bands between pressure roller pairs $i$, $i^1$ for a preliminary pressing out of the liquid content of, or moisture held by, the material under treatment. The bands $h$, $h^1$ are of canvas, or of finely woven wire, or other fabric, so that the expressed moisture can readily escape and fall into a collecting trough $m$ from which it may be run off into a suitable container such as that marked $n$ at the side of the frame. If the material treated is of such a nature that a valuable constituent is expressed from the material and carried away by the liquid a pump $o$ operating in conjunction with a filter device may be employed for drawing off the liquor and forcing it through the filter which retains the said constituent. Where sludges and substances suspended in liquids are dealt with, the bight between the travelling bands may be placed in direct contact with such sludges and liquids.

The partly dehydrated material, still gripped between the bands $h$, $h^1$, next passes over heated drums $p$, $p^1$, idler guide rolls $q$, $q^1$ beneath which the bands are passed, being disposed low down in relation to these drums in order to give as much lap as possible of the bands $h$, $h^1$ upon the drums. When the bands $h$, $h^1$ have passed over the top of the drum $p^1$, they are separated, the band $h$ being passed around an idler roll $r$ to make its return flight over the drums $p$, $p^1$ as indicated by the upper straight arrow in Figure 1. The band $h^1$ continues around the drum $p^1$ and then makes its return flight as indicated by the lower straight arrow in Figure 1. Scraper devices $s$, $s^1$ or brushes are provided for removing material adhering to the bands just beyond the point of separation, and such scraper devices may be fashioned to control the form in which it is desired to have the material delivered, for example, in sheet, shred, granular or dust form.

The material falling from the bands and removed by the scrapers $s$, $s_1$ is received in a trough $t$ extending across the frame $a$ and in this trough there is a worm conveyor $t^1$ for moving the material along the trough to the discharge point. The material may be subjected to a further fashioning treatment whilst in the trough $t$, as by providing the worm $t^1$ with serrated or shaped edges to the said worm. In some cases a spiral brush may be used as the worm conveyor. At the delivery of the trough $t$ there may be a conveyor or elevator $w$ or any other suitable means for transferring material from the trough $t$ into a drying cylinder $u$. Thus, instead of the conveyor $w$, the shaft of the worm conveyor $t^1$ may be fitted with flexible paddles adapted for beating material from the trough $t$ into the cylinder $u$. A shaft $v$ revolubly mounted so as to extend along the longitudinal axis of the cylinder, is provided with a propelling spiral $v^1$ carrying on its periphery a number of small troughs $v^2$ the function of the latter being to lift the material to the top of the interior of the cylinder and then drop it, the object being to subject the material to intimate contact with hot gases or heated air passed through the cylinder, as hereinafter described. Alternatively, hot air or gases may be passed through a jacket $u^2$ on the cylinder $u$ and also through the shaft $v$ which may be made hollow for the purpose. A duct $u^1$ may be provided along the top of the cylinder for the collection of vapours given off from the material and such vapours may be led away from the duct $u^1$ to a condenser. The shaft $v$ may be of relatively large diameter when hollow and may contain a worm blade for forcing the heated gases against the inner surface of the shaft.

At the entry of the material into the cylinder $u$ or at a point between the bands after they pass the pressure rolls $i$, $i^1$ other substances may be added to the material for the production of combined products, and such substances may be introduced in either solid or liquid form.

Discharge of material propelled along the cylinder $u$ by the spiral $p^1$ is received by a worm or other conveyor $x$ which delivers the material into a receiver $y$ wherein it may be briquetted or from which it may be removed and stored or further treated as desired.

When roots are to be dealt with, a so-called hogger comprising bladed, spiked or other rollers $l$ and tines $2$ for picking up the roots and guiding them to the rollers, is attached to the underside of the frame $a$. The roots emerging in a divided condition from the rollers $l$ are deposited on the ground to be picked up by the tines on the plate $k$, the material then undergoing the same treatment as hereinbefore described.

For the treatment of peat, the sled $z$, beneath the fore part of the frame, may support a harrow or scarifier $Z'$ adapted in known manner for breaking up the peat layer, the broken peat then coming under the influence of the roller $j$, tines on the plate $k$ and drum $g$ and following the course of treatment hereinbefore described.

For any of the operations above described, the rear part of the frame may be supported on a sled, so that the roller $j$, tines on the plate $k$ and other underframe parts will be supported in suitable proximity to the ground.

The machine elements hereinbefore described can be driven by any suitable power source and transmission, and the drawings illustrate one example. In this example, an internal combustion engine $3$ is installed on the frame and drives, by means of worm gear $4$, a main shaft $5$. Worm gearing $6$ gears the main shaft $5$ with a cross shaft $7$ which drives the conveyor or elevator $w$ by chain gearing indicated in Figure 1. Worm gearing $8$ gears the main shaft $5$ with the cross shaft of the worm conveyor $t^1$. The drums $p$, $p^1$ are driven from the main shaft $5$ by worm gears $9$ and $10$, the drums $p$, $p^1$ being effective, of course, for driving the endless bands $h, h^1$. When the hogger is to be used, its rollers $l$ may be driven by chain gearing $ll$ from the shaft of the drum $p^1$. The pump $o$, when used, may be driven from a crank disc $l3$ on the shaft of the drum $p$. The drum $g$ is driven by chain gearing $l4$ from the shaft of the drum $p$ and the beater $e$ is driven by chain gearing $l5$ from the shaft of the drum $g$. At the forward end of the main shaft $5$, there is a worm gearing $l6$ for driving a cross shaft $l7$ carrying a worm in mesh with a worm wheel $l8$ on the shaft of the propelling spiral $v^1$ within the cylinder $u$. The drive for the conveyor $x$ is not shown but it is apparent that it could appropriately be geared with the shaft $l7$. The drive for the presser rollers $i, i^1$ is not shown but they may be driven by worm gearing from the shaft $5$.

The exhaust pipe $l9$ of the engine $3$ under hood $3'$ is seen in Figure 2 to be connected with a jacket on the cylinder $u$ for the heating of the latter. Waste heat from the engine cooling system may also be utilised for this purpose. The heat from the engine exhaust may be augmented, if desired, by heat obtained from a burner $20'$ in furnace $20$ in which peat or waste matter may be consumed, the flue $2l$ from this furnace being shown joined up with the exhaust pipe $l9$. A fan, ejector or other draught inducer may be provided for promoting movement of combustion gases from the furnace $20$ into the exhaust pipe $l9$. The heat may be further augmented by utilising the exhaust gases from the engine of a tractor employed for hauling the frame $a$, and for this purpose the exhaust outlet of the tractor engine may be coupled up with the exhaust pipe $l9$ by means of a flexible pipe $22$. From the said jacket, the hot gases are passed on by a pipe connection $23$ to the hollow shaft of the drum $p^1$ and from that shaft to the hollow shaft of the drum $p$ by a pipe connection $24$. If desired, the said gases may be finally passed on to the rollers $i, i^1$ by a pipe connection $25$. By any suitable connection, the hot gases from the pipe $l9$ may be passed through the shaft $v$ of the propelling spiral $v^1$ and, if desired, a proportion of the said gases may be admitted to the interior of the cylinder $u$ for making direct contact with the material under treatment therein.

I claim:

1. Dehydrator plant comprising in combination, a comminutor at the receiving end of said plant, endless conveyor means disposed at the delivery of said comminutor and adapted for taking a grip on material received from said comminutor, pressing means active upon said endless conveyor means at one point in its travel, heated drums supporting said endless conveyor means over a part of its further travel, a heating and drying chamber at the delivery end of said plant, transferring means disposed between the delivery of said endless conveyor means and said chamber and operative for transferring material from said conveyor means into said chamber, and a source of heat connected up for supply of heat to said drums and chamber.

2. Dehydrator plant as claimed in claim 1, and further comprising in combination an internal combustion engine as a source of power and heat, and means for conveying waste heat from the said engine to the units requiring heat supply.

3. Dehydrator plant as claimed in claim 1, and further comprising in combination a furnace device as a source of heat for the units requiring heat supply.

4. Dehydrator plant comprising in combination, a comminutor at the receiving end of said plant, companion endless conveyors comprising flight lengths running together and presenting an entry bight to the delivery from said comminutor, pressing means active upon a portion of said flight lengths, heated drums supporting another portion of said flight lengths, a heating and drying chamber at the delivery end of said endless conveyor where said flight lengths separate, and transferring means disposed between said delivery end and said chamber and operative for transferring material from said conveyors into said chamber.

5. Dehydrator plant as claimed in claim 4 and further comprising a mobile frame supporting said plant, and collector means affixed on the underside of said frame and operative for lifting material from the ground traversed and feeding such material to the comminutor.

6. Dehydrator plant as claimed in claim 4 and further comprising a mobile frame supporting said plant, a scarifier detachably affixed beneath the forward portion of said mobile frame, and collector means affixed beneath the rearward portion of said frame and operative for lifting material from the ground and feeding it to the comminutor.

7. Dehydrator plant as claimed in claim 4 and further comprising a mobile frame supporting said plant, collector means affixed beneath the rearward portion of said mobile frame and operative for lifting material from the ground and feeding it to the comminutor, and a rotary cutter comprising lifting means affixed beneath said frame in advance of said collector means and operative for lifting and cutting up material and re-depositing the cut-up material for collection by the collector means.

8. Dehydrator plant as claimed in claim 1, and further comprising a liquid collector disposed beneath that portion of the endless conveyor which is acted upon by the pressing means, a pump operative for drawing off liquid matter from said collector, and filter means in connection with the delivery of said pump.

9. Dehydrator plant comprising in combination a comminutor at the receiving end of said plant, endless conveyor means disposed at the delivery of said comminutor and adapted for taking a grip on material received from said comminutor, pressing means active upon said endless conveyor means at one point in its travel, heated drums supporting said endless conveyor means over a part of its further travel, a cylinder enclosing a screw feed conveyor adapted for alternately lifting and dropping material fed into said cylinder, transferring means disposed between the delivery of said endless conveyor means and said cylinder and operative for feeding material from said conveyor means into said cylinder, and heating means in connection with said cylinder.

10. Dehydrator plant as claimed in claim 9, and further comprising as heating means a jacket on said cylinder, and connecting means between said jacket and a source of heat.

11. Dehydrator plant as claimed in claim 1 and wherein the comminutor comprises a revoluble drum armed externally with comminuting devices and a concave plate spaced from said drum and armed on its concave surface with comminuting devices adapted for cooperating with those on said drum.

12. Dehydrator plant as claimed in claim 1 and wherein the comminutor comprises a revoluble drum armed externally with comminuting devices, a concave plate spaced from said drum, and a mat device attached to the concave surface of said plate said mat device being bristled with points presented towards the armed surface of said drum.

13. Dehydrator plant as claimed in claim 9 and wherein the screw feed conveyor within the cylinder comprises a worm fitted along its peripheral edge with a number of scoop devices adapted for alternately lifting and dropping material within the cylinder.

HECTOR NORMAN McLEOD.